United States Patent
Tanaka et al.

(10) Patent No.: US 8,216,721 B2
(45) Date of Patent: Jul. 10, 2012

(54) SEALED BATTERY

(75) Inventors: Noriko Tanaka, Osaka (JP); Tsuyoshi Hatanaka, Wakayama (JP)

(73) Assignee: Panasonic Corporation, Osaka (JP)

( * ) Notice: Subject to any disclaimer, the term of this patent is extended or adjusted under 35 U.S.C. 154(b) by 216 days.

(21) Appl. No.: 12/161,749

(22) PCT Filed: Jan. 19, 2007

(86) PCT No.: PCT/JP2007/050767
§ 371 (c)(1),
(2), (4) Date: Jul. 22, 2008

(87) PCT Pub. No.: WO2007/083731
PCT Pub. Date: Jul. 26, 2007

(65) Prior Publication Data
US 2010/0015510 A1    Jan. 21, 2010

(30) Foreign Application Priority Data
Jan. 23, 2006    (JP) ................................ 2006-013392

(51) Int. Cl.
*H01M 2/18* (2006.01)
*H01M 4/02* (2006.01)
(52) U.S. Cl. ........ 429/246; 429/142; 429/144; 429/427; 429/433; 429/434
(58) Field of Classification Search .......................... None
See application file for complete search history.

(56) References Cited

FOREIGN PATENT DOCUMENTS

| JP | 07-220759 | | 8/1995 |
|---|---|---|---|
| JP | 08-236093 | | 9/1996 |
| JP | 2000-100408 | | 4/2000 |
| JP | 2004-095200 | | 3/2004 |
| JP | 2004-253253 | | 9/2004 |
| JP | 2004-235695 | | 9/2005 |
| JP | 2006120604 | * | 5/2006 |
| JP | 2006-351386 | | 12/2006 |

OTHER PUBLICATIONS

Chinese Office Action issued in Chinese Patent Application No. 200780002965.2, mailed Jun. 7, 2010.

* cited by examiner

*Primary Examiner* — Patrick Ryan
*Assistant Examiner* — Ladan Mohaddes
(74) *Attorney, Agent, or Firm* — McDermott Will & Emery LLP

(57) ABSTRACT

A sealed battery includes an electrode group formed by winding or stacking a positive electrode including a current collector carrying an active material layer thereon, a negative electrode including a current collector carrying an active material layer thereon and a separator interposed therebetween. The current collectors of the positive and negative electrodes are exposed at an end thereof and the exposed ends are welded to current collector terminals, respectively. The active material layers formed on the surfaces of the current collectors are covered with heat resistant porous films, respectively. An end face of the separator is flush with or positioned inside relative to end faces of the heat resistant porous films. The heat resistant porous films have a melting point higher than that of the separator and have a thermal conductivity lower than that of the current collectors.

5 Claims, 5 Drawing Sheets

FIG. 3

| | Negative electrode | | | | Positive electrode | | | |
|---|---|---|---|---|---|---|---|---|
| | Exposed part of current collector | Porous film | Position of separator end face relative to: | | Exposed part of current collector | Porous film | Position of separator end face relative to: | |
| | | | Active material layer | Porous film | | | Active material layer | Porous film |
| Ex. 1 | present | present | 2 mm outside | 2 mm inside | present | present | 4 mm outside | 2 mm inside |
| Ex. 2 | present | present | 2 mm outside | flush | present | present | 4 mm outside | flush |
| Ex. 3 | present | present | 2 mm outside | 2 mm inside | not present | not present | 4 mm outside | - |
| Ex. 4 | not present | not present | 2 mm outside | - | present | present | 4 mm outside | 2 mm inside |
| Ex. 5 | present | present | 6 mm outside | 2 mm outside | present | present | 8 mm outside | 2 mm outside |
| Ex. 6 | present | present | 3 mm inside | 7 mm inside | present | present | 1 mm inside | 7 mm inside |
| Com. Ex. 1 | present | not present | 2 mm outside | - | present | not present | 2 mm outside | - |
| Com. Ex. 2 | present | not present | 2 mm outside | - | present | not present | 2 mm outside | - |

FIG. 4

|  | State of weld | Buckling | Ratio of OCV-defective battery (%) |
|---|---|---|---|
| Ex. 1 | ○ | Not found | 0.02 |
| Ex. 2 | ○ | Not found | 0.03 |
| Ex. 3 | ○ | Not found | 0.05 |
| Ex. 4 | ○ | Not found | 0.06 |
| Ex. 5 | △ | Not found | 0.07 |
| Ex. 6 | ○ | Not found | 0.08 |
| Com. Ex. 1 | × | Found | 3 |
| Com. Ex. 2 | × | Not found | — |

FIG.5

| | Negative electrode | | | | Positive electrode | | | |
|---|---|---|---|---|---|---|---|---|
| | Exposed part of electrode base | Porous film | Position of separator end face relative to: | | Exposed part of electrode base | Porous film | Position of separator end face relative to: | |
| | | | Active material layer | Porous film | | | Active material layer | Porous film |
| Ex. 7 | present | present | 2 mm outside | 2 mm inside | present | present | 4 mm outside | 2 mm inside |
| Ex. 8 | present | present | 2 mm outside | flush | present | present | 4 mm outside | flush |
| Ex. 9 | present | present | 2 mm outside | 2 mm inside | not present | not present | 4 mm outside | - |
| Ex. 10 | not present | not present | 2 mm outside | - | present | present | 4 mm outside | 2 mm inside |
| Ex. 11 | present | present | 6 mm outside | 2 mm outside | present | present | 8 mm outside | 2 mm outside |
| Ex. 12 | present | present | 3 mm inside | 7 mm inside | present | present | 1 mm inside | 7 mm inside |
| Com. Ex. 3 | present | not present | 2 mm outside | - | present | not present | 2 mm outside | - |
| Com. Ex. 4 | present | not present | 2 mm outside | - | present | not present | 2 mm outside | - |

FIG. 6

|  | State of weld | Ratio of occurrence of leakage (%) |
|---|---|---|
| Ex. 7 | ◯ | 0.01 |
| Ex. 8 | ◯ | 0.01 |
| Ex. 9 | ◯ | 0.02 |
| Ex. 10 | ◯ | 0.01 |
| Ex. 11 | △ | 0.03 |
| Ex. 12 | ◯ | 0.04 |
| Com. Ex. 3 | × | 3.2 |
| Com. Ex. 4 | × | — |

SEALED BATTERY

RELATED APPLICATIONS

This application is the U.S. National Phase under 35 U.S.C. §371 of International Application No. PCT/JP2007/050767, filed on Jan. 19, 2007, which in turn claims the benefit of Japanese Application No. 2006-013392, filed on Jan. 23, 2006, the disclosures of which Applications are incorporated by reference herein.

TECHNICAL FIELD

The present invention relates to a sealed battery. In particular, it relates to a sealed battery including a tabless electrode group.

BACKGROUND ART

In recent years, electronic devices have rapidly been converted to portable and wireless. As a driving source for such devices, a high voltage nonaqueous electrolyte secondary battery having high energy density is coming into practical use. Not only to such small-size consumer products, the technology of the nonaqueous electrolyte secondary battery is also applied to a high capacity battery used for energy storages and electric vehicles and to a high power battery used for electric tools and hybrid electric vehicles (HEV). The nonaqueous electrolyte secondary battery includes an electrode group prepared by winding strip-like positive and negative electrodes, each of which is made of an electrode material mixture layer and a current collector, together with a separator which electrically insulates the positive and negative electrodes and supports an electrolyte thereon. In general, a thin microporous polyethylene sheet having a thickness of several tens µm is used as the separator.

For increasing the power of the nonaqueous electrolyte secondary battery, the electrode group of the secondary battery is configured into a so-called "tabless" electrode group. To be more specific, each of the positive and negative current collectors carrying an active material thereon is prepared such that an end of the current collector is exposed. Then, the exposed end of the current collector is welded to a current collector terminal. Accordingly, a current path to every part of the strip-like electrode is uniformly ensured and the output property is improved.

If the tabless electrode group is adopted, the exposed part of the current collector and the current collector terminal are welded near the separator. In general, the separator is made of a resin such as polyethylene and therefore less heat resistive. Therefore, the separator may partially melt in the welding process and an internal short circuit may occur between the positive and negative electrodes. Even if the internal short circuit does not occur, the separator may shrink as it partially melts. As a result, part of the current collector is deformed to bring about buckling of the electrode group.

As a measure to prevent the melting of the separator and the insulation failure between the electrodes, Patent Literature 1 describes a method of keeping the tip of the separator and the tip of the active material layer formed on the current collector at a certain distance from the tip of the exposed part of the current collector in the process of welding the exposed part of the current collector and the current collector terminal.

Patent Literature 1 Japanese Unexamined Patent Publication No. 2004-253253

Patent Literature 2 Japanese Unexamined Patent Publication No. 2000-100408

Patent Literature 3 Japanese Unexamined Patent Publication No. 2006-351386

DISCLOSURE OF THE INVENTION

Problem that the Invention is to Solve

In the process of welding the exposed part of the current collector and the current collector terminal, the melting of the separator is caused by welding heat transferred to the separator through the current collector having high thermal conductivity. Therefore, even if a certain distance is kept between the tip of the separator and the tip of the exposed part of the current collector, it is difficult to surely avoid the melting of the separator. If the distance between the tip of the separator and the tip of the exposed part of the current collector is increased to avoid the melting of the separator, the width of the active material layer is substantially reduced. This may bring about decrease in capacity.

As a measure to prevent abnormal heat generation resulting from the internal short circuit between the electrodes, a method of providing a heat resistant porous film between the positive and negative electrodes in addition to the separator has been proposed (cf. Patent Literatures 2 and 3). The proposed method provides the separator which is less heat resistive with a shutdown function against the internal short circuit (the separator is adapted to melt to close the pores such that ionic conduction is blocked). Further, even if abnormal heat is generated by the internal short circuit and the separator melts to a fluid state, the short circuit between the electrodes is prevented by the heat resistant porous film.

For applying the tabless structure to the aforementioned electrode group to increase the power of the battery, the positional relationship between the separator and the heat resistant porous film has never been considered to prevent the melting of the separator and the insulation failure between the electrodes.

With the foregoing in mind, the present invention has been achieved. An object of the present invention is to provide a highly safe sealed battery including a tabless electrode group in which the melting of the separator and the insulation failure between the electrodes do not occur in the process of welding the exposed part of the current collector and the current collector terminal.

Means of Solving the Problem

The sealed battery of the present invention is a sealed battery including an electrode group provided by stacking a positive electrode including a current collector carrying an active material layer thereon and a negative electrode including a current collector carrying an active material layer thereon with a separator interposed therebetween. At least one of the current collector of the positive electrode and the current collector of the negative electrode is exposed at an end thereof and the exposed end is welded to a current collector terminal. The active material layer formed on the surface of the at least one of the current collectors welded to the current collector terminal is covered with a heat resistant porous film and an end face of the separator is flush with or positioned inside relative to an end face of the heat resistant porous film. Further, the heat resistant porous film has a melting point higher than that of the separator and has a thermal conductivity lower than that of the current collector.

It is preferable that the end face of the separator is positioned outside relative to an end face of the active material layer formed on the surface of the at least one of the current collectors welded to the current collector terminal.

Effect of the Invention

According to the present invention, the active material layer formed on the surface of the current collector is covered with a heat resistant porous film having a thermal conductivity lower than that of the current collector, and the end face of the separator is flush with or positioned inside relative to the end face of the heat resistant porous film. As a result, even if heat generated in the process of welding the exposed part of the current collector to the current collector terminal is transferred through the current collector, the heat is insulated by the heat resistant porous film and the melting of the separator is effectively prevented. Therefore, an internal short circuit between the positive and negative electrodes and buckling of the electrode group are avoided. Thus, the sealed battery is provided with high safety and reliability.

The heat insulating effect of the heat resistant porous film makes it possible to arrange the end of the separator closer to the exposed end of the current collector. As a result, the active material layer is also brought closer to the exposed end of the current collector. Thus, the sealed battery is downsized to a further extent.

BRIEF DESCRIPTION OF DRAWINGS

FIG. 3 is a table showing the evaluation results of examples of lithium ion secondary batteries of the present invention.

FIG. 4 is a table showing the evaluation results of the examples of lithium ion secondary batteries of the present invention.

FIG. 5 is a table showing the evaluation results of examples of nickel-metal hydride batteries of the present invention.

FIG. 6 is a table showing the evaluation results of the examples of nickel-metal hydride batteries of the present invention.

EXPLANATION OF REFERENCE NUMERALS

Figure 1:
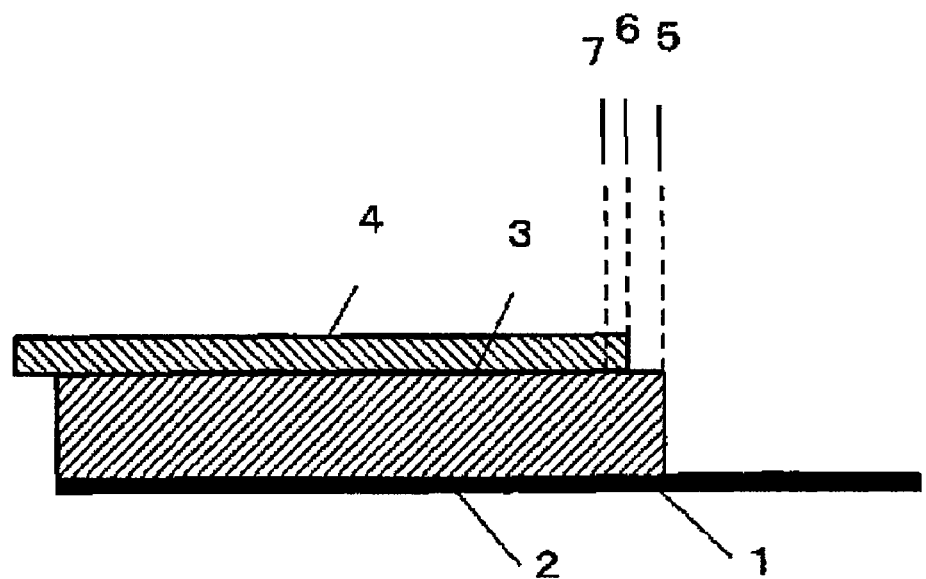
FIG. 1 is a sectional view illustrating the structure of an electrode of a sealed battery according to an embodiment of the present invention.

1 Current collector
2 Positive/negative electrode active material layer
3 Heat resistant porous film
4 Separator
5 End face of porous film (near the exposed part of the current collector)
6 End face of separator (near the exposed part of the current collector)
7 End face of active material layer (near the exposed part of the current collector)
8 Electrode group
9, 10 Positive/negative electrode current collector terminal

BEST MODE FOR CARRYING OUT THE INVENTION

Hereinafter, an embodiment of the present invention will be described in detail with reference to the drawings. In the drawings, the same reference numerals are given to components having substantially the same function for easy explanation. The present invention is not limited to the embodiment.

Figure 2:
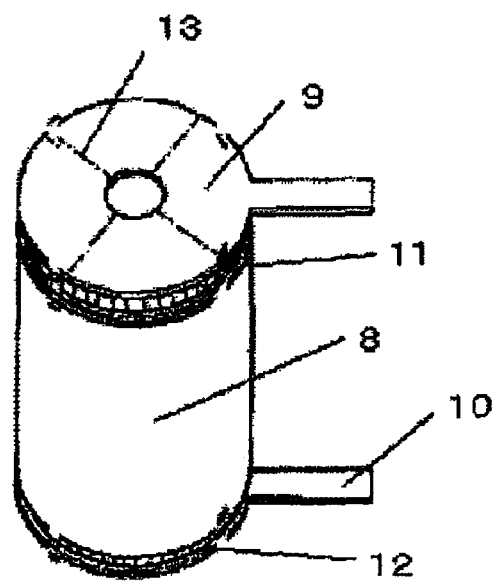
FIG. 2 is a perspective view illustrating a tabless electrode group according to the embodiment of the present invention welded to current collector terminals.

FIG. 1 is a sectional view schematically illustrating one of positive and negative electrodes included in an electrode group of a sealed battery according to the embodiment of the present invention. FIG. 2 is a perspective view illustrating a tabless electrode group welded to a current collector terminal.

As shown in FIGS. 1 and 2, positive and negative electrodes, each of which is made of a current collector 1 carrying an active material layer 2 thereon, are wound or stacked in the form of an electrode group 8 with a separator 4 interposed therebetween. An end of the current collector 1 of the positive or negative electrode or ends of the current collectors 1 of the positive and negative electrodes is/are exposed and the exposed end(s) of the current collector(s) 1 is/are welded to current collector terminal(s) 9 and/or 10. The active material layer 2 provided on the surface of the current collector 1 is covered with a heat resistant porous film 3 and an end face 6 of the separator 4 is flush with or positioned inside relative to an end face 5 of the heat resistant porous film 3.

The end face 6 of the separator 4 is preferably positioned outside relative to an end face 7 of the active material layer 2 formed on the surface of the current collector 1.

Material of the heat resistant porous film 3 is not particularly limited as long as the heat resistant porous film 3 is provided with a melting point higher than that of the separator 4 and a thermal conductivity lower than that of the current collector 1. In general, the separator 4 has a melting point of 90° C. to 150° C. Therefore, the melting point of the heat resistant porous film 3 is preferably 200° C. or higher.

For example, a material containing an insulating filler and a binder may be used as the material of the heat resistant porous film 3. The insulating filler may preferably be an inorganic oxide filler. Examples of the inorganic oxide may include alumina, zeolite, silicon nitride, silicon carbide, titanium oxide, zirconium oxide, magnesium oxide, zinc oxide, silicon dioxide, etc.

The material of the heat resistant porous film 3 may also be polyimide, polyamide-imide, aramid, polyphenylene sulfide or a heat resistant resin such as polyether-imide, polyethyleneterephthalate, polyether nitrile, polyether ether ketone or polybenzimidazole.

It is preferable that a highly pure and chemically stable material is selected as the heat resistant porous film 3 such that the heat resistant porous film 3 does not cause a side reaction that may affect the battery property even if the heat resistant porous film 3 is immersed in an organic electrolyte in use of the battery or at an oxidation-reduction potential.

Examples of the binder include polyethylene (PE), polypropylene (PP), polytetrafluoroethylene (PTFE), polyvinylidene fluoride (PVDF), styrene-butadiene rubber (SBR), etc. It is preferable that the binder contains at least a rubbery polymer containing an amorphous polyacrylonitrile unit having high heat resistance.

The heat resistant porous film 3 may be formed by direct application onto the active material layer 2. Or alternatively, the heat resistant porous film 3 may be inserted between the positive or negative electrode and the separator in the process of forming the electrode group 8.

The separator 4 is preferably a microporous film capable of surely supporting the electrolyte solution and working stably at a potential of the positive or negative electrode. For example, the separator 4 may be made of polypropylene, polyethylene, polyimide or polyamide.

As the positive electrode active material, a material capable of intercalating and deintercalating lithium may be used, e.g., a lithium oxide composite. Specifically, the lithium oxide composite may be represented by the composition formula of $LiMO_2$ or $LiM_2O_4$, wherein M is at least one of transition metals of Co, Mn, Ni, Fe, etc. Part of the transition metal may be substituted with other element such as Al, Mg, Li, etc.

For providing the positive electrode, a positive electrode paste prepared by kneading a positive electrode active material, a conductive material and a binder is applied to a positive electrode current collector and dried. Then, the obtained product is rolled to a predetermined thickness and cut into a predetermined dimension. Examples of the conductive material may include carbon blacks such as acetylene black (AB) and Ketjen black (KB) and graphites. Examples of the binder may include PVDF, modified acrylic rubber and polytetrafluoroethylene which are stable at a positive electrode potential. In addition, a thickener for stabilizing the paste may be used, e.g., a cellulose resin such as carboxymethyl cellulose (CMC). As the positive electrode current collector, aluminum foil which is stable at the positive electrode potential may be used.

As the negative electrode active material, a material capable of intercalating and deintercalating lithium may be used, e.g., graphite, silicide or a titanium alloy. Examples of the binder may include PVDF and a styrene-butadiene rubber copolymer (SBR) which are stable at a negative electrode potential. A thickener for stabilizing the paste may be used, e.g., a cellulose resin such as CMC. Further, as the negative current collector, copper foil which is stable at the negative electrode potential may be used.

After the electrode group 8 is provided, the welding of the exposed part of the current collector 1 to the current collector terminal 9 or 10 may be performed by, for example, laser welding, ultrasonic welding, resistance welding or TIG welding.

Hereinafter, examples of lithium ion secondary batteries according to the present invention will be explained.

EXAMPLE 1

Artificial graphite was used as the negative electrode active material, an aqueous SBR dispersion was used as the binder and carboxymethyl cellulose (CMC) was used as the thickener. The negative electrode active material, the binder and the thickener were prepared in a solid content ratio of 96:3:1 (wt %). Water as a solvent was added thereto in an amount of 100% relative to the solid content weight and the mixture was kneaded to obtain negative electrode material paste. The paste was applied to the surfaces of a negative current collector made of a 10 μm thick copper foil such that a 10 mm wide part of the copper foil was left exposed on each of the surfaces and dried. Then, it was rolled and cut to provide a negative electrode of 0.077 mm thick, 124 mm wide (width of the electrode material mixture: 114 mm) and 3300 mm long.

A porous film based on an inorganic oxide filler was formed on the negative electrode. Specifically, alumina having a median diameter of 0.3 μm and modified polyacrylonitrile rubber as a binder (solid content: 8 wt %) prepared in a weight ratio of 8:3 were mixed with a proper amount of NMP and they were kneaded in a planetary mixer to prepare slurry of a heat resistant porous film material. The slurry was applied to the surfaces of the negative electrode in a thickness of 4 μm such that a 6 mm wide part of the copper foil was left exposed on each of the surfaces and dried. Thus, a negative electrode plate was provided.

As a positive electrode active material, lithium nickel composite oxide represented by the composition formula of $LiNi_{0.7}Co_{0.2}Al_{0.1}O_2$ was used. To be more specific, cobalt sulfate and aluminum sulfate in a predetermined ratio were added to an aqueous $NiSO_4$ solution to prepare a saturated aqueous solution. To the saturated aqueous solution being stirred, an alkaline solution dissolving sodium hydroxide therein was slowly dropped to neutralize the saturated aqueous solution. As a result, a precipitate of ternary system nickel hydroxide $Ni_{0.7}Co_{0.2}Al_{0.1}(OH)_2$ was produced. The precipitate was filtered and washed with water, and then dried at 80° C. The average particle diameter of the resulting nickel hydroxide was 10 μm.

Then, $Ni_{0.7}Co_{0.2}Al_{0.1}(OH)_2$ was heated at 900° C. in the atmospheric air for 10 hours to obtain nickel oxide $Ni_{0.7}Co_{0.2}Al_{0.1}O$. The resulting oxide was identified as single-phase nickel oxide by X-ray diffraction. Then, lithium hydroxide monohydrate was added thereto such that the sum of the atomic numbers of Ni, Co and Al becomes equal to the atomic number of Li. The resulting product was heated at 800° C. in dried air for 10 hours. Thus, $LiNi_{0.7}Co_{0.2}Al_{0.1}O_2$ was obtained as intended. The resulting lithium nickel composite oxide was identified by X-ray diffraction as a single-phase hexagonal layered crystal in which Co and Al were in a solid solution state. AB was used as the conductive material and PVDF was used as the binder. The positive electrode active material, the conductive material and the binder were prepared in a solid content ratio of 90:5:6 (wt %) and were kneaded with n-methyl-2-pyrrolidone (NMP) as a solvent to prepare positive electrode material paste. The paste was applied to the surfaces of a positive electrode current collector made of 15 μm thick aluminum foil such that a 10 mm wide part of the aluminum foil was left exposed on each of the surfaces and dried. Then, it was rolled and cut to provide a positive electrode of 0.078 mm thick, 120 mm wide (width of the electrode material mixture: 110 mm) and 3090 mm long.

A porous film based on the inorganic oxide filler was formed on the positive electrode. Specifically, a porous film material slurry was applied to the surfaces of the positive electrode in a thickness of 4 μm such that a 4 mm wide part of the aluminum foil was left exposed on each of the surfaces and dried. Thus, a positive electrode plate was provided.

The thermal conductivities of the current collectors and the porous film were measured by a laser flash method. At 23° C., the copper foil as the negative electrode current collector showed a thermal conductivity of 392 W/m·K and the aluminum foil as the positive electrode current collector showed 228 W/m·K, whereas the porous film showed 0.6 W/m·K. Thus, it was confirmed that the thermal conductivity of the porous film was lower than the thermal conductivities of the positive and negative electrode current collectors.

The positive and negative electrodes were wound into an electrode group with a separator 4 made of a 20 μm thick and 118 mm wide polyethylene/polypropylene composite film interposed therebetween. In this process, the separator 4 was arranged such that the end face 6 of the separator 4 was positioned outside relative to the end face 7 of the positive electrode active material layer 2 by 4 mm and was positioned outside relative to the end face 7 of the negative electrode active material layer 2 by 2 mm. At the same time, the separator 4 was arranged such that the end face 6 was positioned inside relative to the end faces 5 of the porous films 3 of the positive and negative electrodes by 2 mm.

A 0.3 mm thick and 30 mm diameter aluminum positive electrode current collector terminal was laser-welded to the exposed part of the positive electrode current collector of the thus formed electrode group using a YAG laser. An integral power was 180 W. Further, a 0.2 mm thick and 30 mm diameter nickel negative electrode current collector terminal was laser-welded to the exposed part of the negative electrode current collector. An integral power was 120 W.

The electrode group was inserted in the battery case, the positive electrode current collector terminal was laser-welded to the sealing plate, and then the negative electrode current collector terminal was welded to the bottom of the battery case by resistance welding. An electrolyte solution prepared by dissolving 1 mol/l of $LiPF_6$ in a solvent containing ethylene carbonate (EC), diethyl carbonate (DEC) and dimethyl carbonate (DMC) in the ratio of 20:40:40 (wt %) was poured in the battery case, and then the opening end of the battery case was sealed. Thus, a nonaqueous electrolyte lithium secondary battery was prepared.

EXAMPLE 2

A nonaqueous electrolyte lithium secondary battery was prepared in the same manner as Example 1 except that a 122 mm wide separator was used and arranged such that the end face of the separator was flush with the end faces of the porous films of the positive and negative electrodes.

EXAMPLE 3

A nonaqueous electrolyte lithium secondary battery was prepared in the same manner as Example 1 except that the positive electrode plate free from the exposed part of the current collector and the porous film was prepared and a 0.15 mm thick and 3.5 mm wide aluminum current collector terminal was welded to a lengthwise end of the electrode plate by ultrasonic welding.

EXAMPLE 4

A nonaqueous electrolyte lithium secondary battery was prepared in the same manner as Example 1 except that the negative electrode plate free from the exposed part of the current collector and the porous film was prepared and a 0.1 mm thick and 3 mm wide nickel current collector terminal was welded to a lengthwise end of the electrode plate by resistance welding.

EXAMPLE 5

A nonaqueous electrolyte lithium secondary battery was prepared in the same manner as Example 1 except that a 126 mm wide separator was used and arranged such that the end face of the separator was positioned outside relative to the end faces of the porous films near the exposed parts of the positive and negative current collectors by 2 mm.

EXAMPLE 6

A nonaqueous electrolyte lithium secondary battery was prepared in the same manner as Example 1 except that a 108 mm wide separator was used and arranged such that the end face of the separator was positioned inside relative to the end face of the positive electrode active material layer by 1 mm and was positioned inside relative to the end face of the negative electrode active material layer by 3 mm. At the same time, the end face of the separator was positioned inside relative to the end faces of the porous films of the positive and negative electrodes by 2 mm.

COMPARATIVE EXAMPLE 1

A nonaqueous electrolyte lithium secondary battery was prepared in the same manner as Example 1 except that the positive and negative electrodes free from the porous films were prepared.

COMPARATIVE EXAMPLE 2

A nonaqueous electrolyte lithium secondary battery was prepared in the same manner as Comparative Example 1 except that the exposed part of the positive electrode current collector and the positive electrode current collector terminal were laser-welded at an integral power of 150 W, whereas the exposed part of the negative electrode current collector and the negative electrode current collector terminal were laser-welded at an integral power of 100 W.

The electrode group of each of the thus-prepared batteries was disassembled to observe welds between the exposed parts of the positive and negative current collectors and the current collector terminals. The state of the weld was judged as "○" when the weld between the exposed part of the positive electrode current collector and the positive electrode current collector terminal showed a tensile strength of 1.5 N or higher, the weld between the exposed part of the negative electrode current collector and the negative electrode current collector terminal showed a tensile strength of 4 N or higher and the separator did not melt. The weld that did not meet these conditions was judged as "x". Further, a cross sectional observation by X-ray CT was performed to check whether the battery was buckled or not.

These batteries were charged and discharged under predetermined conditions. Then, in a 25° C. environment, the batteries were charged to 4.1 V and discharged to 2.5 V at C/5 rate and a constant current. After 3 cycles of the constant current charge and discharge, the batteries, charged to 4.1 V, were left in a 45° C. environment for a week. Then, open circuit voltages (OCV) of the batteries before being left in the 45° C. environment were compared with those of the batteries after being left in the 45° C. environment to calculate the difference (ΔOCV). Among the batteries, those having ΔOCV out of the range of 3 σ were judged as OCV-defective batteries. The ratio of the OCV-defective batteries in the batteries of each Example was calculated. FIG. 3 and FIG. 4 show the results.

In the battery of Comparative Example 1 in which the porous films were not provided on the active material layers, the separator melted. The cross sectional observation by X-ray CT found that the electrode group was buckled. As the separator melted, a short circuit occurred between the positive and negative electrode plates. As a result, the ratio of the OCV-defective batteries was significantly increased. Presumably, in the process of welding the exposed part of the current collector and the current collector terminal, the end of the separator came to contact with the exposed part of the current collector and welding heat was transferred to the separator through the highly thermally conductive current collector, thereby melting the separator. In the battery of Comparative Example 2, the exposed part of the current collector and the current collector terminal were welded at a lower integral power so as to prevent the melting of the separator. However, the tensile strength at the weld between the exposed part of the current collector and the current collector terminal did not meet the condition. As a result, the battery of Comparative Example 2 was judged as defective in welding.

In all the batteries of Examples 1 to 4, in each of which the active material layers were covered with the porous films having a lower thermal conductivity than that of the current collectors and the end face of the separator was flush with or positioned inside relative to the end faces of the porous films, the state of the weld was good and the buckling of the electrode group was not observed. This is probably because heat generated in the process of welding the exposed part of the current collector to the current collector terminal and transferred through the current collector was insulated by the porous film and the separator did not melt. Therefore, the internal short circuit between the positive and negative electrodes and the bucking of the electrode group were avoided. The effect of the porous film was confirmed by providing the porous film on either or both of the positive and negative electrode active material layers.

In the battery of Example 5 in which the active material layers were covered with the porous films each having a thermal conductivity lower than that of the current collectors and the end face of the separator was positioned outside relative to the end faces of the porous films, the buckling of the electrode group as observed in the battery of Comparative Example 1 did not occur, but the separator slightly melted. Since the end face of the separator was positioned outside relative to the end faces of the porous films, it is considered that the end face of the separator came to contact with the exposed part of the current collector and therefore melted. However, as the separator melted only slightly and the porous films covered the active material layers, the ratio of the OCV-defective batteries due to the short circuit between the positive and negative electrodes as found in the battery of the Comparative Example 1 was low. The results indicate that it is preferable to arrange the separator such that the end face of the separator is flush with or positioned inside relative to the end face of the porous film near the exposed part of the current collector.

In the battery of Example 6 in which the end face of the separator is positioned inside relative to the end faces of the positive and negative electrode active material layers, the separator was not present on parts of the surfaces of the positive and negative electrodes facing each other and the insulation between the parts of the electrodes was kept only by the porous films provided on the surfaces of the active material layers. Therefore, as compared with the batteries of Examples 1 and 2 in each of which the end face of the separator was positioned outside relative to the end faces of the positive and negative electrode active material layers, the ratio of the OCV-defective batteries was slightly increased. Thus, it is found that the end face of the separator is preferably positioned outside relative to the end faces of the positive and negative electrode active material layers.

Hereinafter, examples of nickel-metal hydride batteries of the present invention are explained in detail.

EXAMPLE 7

Water was mixed with hydrogen absorbing alloy powder to prepare paste and the paste was filled into a porous nickel foam body having a porosity of 95%. The resulting product was dried, pressurized and cut into a predetermined dimension to prepare a hydrogen absorbing alloy negative electrode. Further, spherical nickel hydroxide powder, cobalt powder and cobalt hydroxide powder were mixed in a weight ratio of 100:7:5 and water was added thereto to prepare paste. The paste was filled into a porous nickel foam body having a porosity of 95% as an electrode base. Then, the resulting product was dried, pressurized and cut into a predetermined dimension to prepare a nickel positive electrode. Each of the positive and negative electrodes was prepared such that part of the electrode base along the lengthwise end thereof was left exposed to provide a 10 mm wide exposed part.

A porous film based on the inorganic oxide filler used in Example 1 was formed on each of the positive and negative electrodes. In the process of forming the porous film, porous film material slurry was applied to each of the surfaces of the negative and positive electrode bases to a thickness of 4 μm such that part of the negative electrode base along the lengthwise end thereof was left exposed to provide a 6 mm wide exposed part and part of the positive electrode base along the lengthwise end thereof was left exposed to provide a 4 mm wide exposed part.

The thus-prepared positive and negative electrodes were wound into a spiral with a separator interposed therebetween. The end face of the separator was positioned outside relative to the end face of the positive electrode active material layer by 4 mm, whereas it was positioned outside relative to the end face of the negative electrode active material layer by 2 mm. As the separator, a sulfonated polypropylene nonwoven fabric prepared by sulfonating polypropylene nonwoven fabric was used.

After an electrode group was prepared as described above, 0.3 mm thick and 30 mm diameter current collector terminals made of nickel-plated iron were welded to the exposed parts of the positive and negative electrode bases of the electrode group, respectively, using a resistance welding machine. The welding was performed using a 2 mm diameter welding electrode at a pressure of 160 N and a current value of 2 kA for an energizing period of 5 ms.

The electrode group was inserted in a battery case and an electrolyte solution prepared by adding 40 g/L of lithium hydroxide (LiOH) to 1.4 g/cc of potassium hydroxide (KOH) was poured therein. Then, the opening end of the battery case was sealed to prepare a nickel-metal hydride battery.

EXAMPLE 8

A nickel-metal hydride battery was prepared in the same manner as Example 7 except that the end face of the separator was flush with the end faces of the porous films near the exposed parts of the positive and negative electrode bases.

EXAMPLE 9

A nickel-metal hydride battery was prepared in the same manner as Example 7 except that the positive electrode plate free from the exposed part of the electrode base and the porous film was prepared and a 0.15 mm thick and 3.5 mm wide nickel current collector terminal was welded to a lengthwise end of the positive electrode plate by ultrasonic welding.

EXAMPLE 10

A nickel-metal hydride battery was prepared in the same manner as Example 7 except that the negative electrode plate free from the exposed part of the electrode base and the porous film was prepared and a 0.1 mm thick and 3 mm wide nickel current collector terminal was welded to a lengthwise end of the negative electrode plate by resistance welding.

EXAMPLE 11

A nickel-metal hydride battery was prepared in the same manner as Example 7 except that the end face of the separator was positioned outside relative to the end faces of the porous films near the exposed parts of the positive and negative electrode bases by 2 mm.

EXAMPLE 12

A nickel-metal hydride battery was prepared in the same manner as Example 7 except that the end face of the separator was positioned inside relative to the end face of the positive electrode active material layer by 1 mm and was positioned inside relative to the end face of the negative electrode active material layer by 3 mm. At the same time, the end face of the separator was positioned inside relative to the end faces of the porous films near the exposed parts of the positive and negative electrode bases by 2 mm.

COMPARATIVE EXAMPLE 3

A nickel-metal hydride battery was prepared in the same manner as Example 7 except that the positive and negative electrode plates free from the porous films were prepared.

COMPARATIVE EXAMPLE 4

A nickel-metal hydride battery was prepared in the same manner as Comparative Example 3 except that the welding of the exposed part of the positive electrode base to the positive electrode current collector terminal and the welding of the exposed part of the negative electrode base to the negative electrode current collector were performed at a current value of 1.7 kA.

The thus-prepared batteries were subjected to the following inspections.

i) After the welding of the current collector terminal, the electrode group was disassembled to observe welds between the exposed parts of the positive and negative electrode bases and the current collector terminals. The state of the weld was judged as "⊚" when the separator did not melt or deteriorate due to the welding or as "x" when the separator melted and/or deteriorated.

ii) After the welding of the current collector, a voltage of 400 V was applied to the electrode group to check whether leakage occurred or not using a leakage checker. The results are shown in FIG. 5 and FIG. 6.

In the battery of Comparative Example 3 in which the porous films were not provided on the active material layers, the separator melted and the ratio of occurrence of the leakage was significantly increased. Presumably, in the process of welding the exposed part of the electrode base to the current collector terminal, the end of the separator came to contact with the exposed part of the electrode base and the separator melted by welding heat. In the battery of Comparative Example 4, the exposed part of the electrode base and the current collector terminal were welded at a lower integral power so as to prevent the melting of the separator. However, the weld between the current collector terminal and the electrode base was not strong enough. The battery of Comparative Example 4 was therefore judged as defective in welding.

In all the batteries of Examples 7 to 10, in each of which the active material layers were covered with the porous films having a lower thermal conductivity than that of the electrode bases and the end face of the separator was flush with or positioned inside relative to the end faces of the porous films near the exposed parts of the electrode bases, the state of the weld was good and the ratio of occurrence of the leakage was significantly low.

This is probably because heat generated in the process of welding the exposed part of the electrode base to the current collector terminal and transferred through the electrode base was insulated by the porous film and the separator did not melt. Therefore, the internal short circuit between the positive and negative electrodes was avoided. The effect of the porous film was confirmed by providing the porous film on either or both of the positive and negative electrode active material layers.

In the battery of Example 11 in which the active material layers were covered with the porous films having a lower thermal conductivity than that of the electrode bases and the end face of the separator was positioned outside relative to the end faces of the porous films near the exposed parts of the electrode bases, the separator slightly melted. Since the end face of the separator was positioned outside relative to the end faces of the porous films, it is considered that the end face of the separator came to contact with the exposed part of the electrode base and therefore melted. However, as the separator melted only slightly and the porous films covered the active material layers, the ratio of occurrence of the leakage due to the short circuit between the positive and negative electrodes as found in the battery of the Comparative Example 3 was low. The results indicate that it is preferable to arrange the separator such that the end face of the separator is flush with or positioned inside relative to the end face of the porous film near the exposed part of the current collector.

In the battery of Example 12 in which the end face of the separator is positioned inside relative to the end faces of the positive and negative electrode active material layers, the separator does not exist on parts of the surfaces of the positive and negative electrodes facing each other and the insulation between the parts of the electrodes is kept only by the porous films provided on the surfaces of the active material layers. Therefore, as compared with the batteries of Examples 1 and 2 in each of which the end face of the separator was positioned outside relative to the end faces of the positive and negative electrode active material layers, the ratio of the batteries that experienced the leakage is slightly increased. Thus, it is found that the end face of the separator is preferably positioned outside relative to the end faces of the positive and negative electrode active material layers.

The preferred embodiment of the present invention described above is not limitative and various kinds of modification may be given thereto. For example, the lithium ion secondary battery and the nickel-metal hydride battery are explained in the above-described Examples. Other than them, the present invention may also be suitably applicable to a lithium primary battery including the same tabless electrode group as that used in these batteries.

INDUSTRIAL APPLICABILITY

As described above, the present invention is useful for a sealed battery including a tabless electrode group.

The invention claimed is:

1. A sealed battery comprising an electrode group provided by winding or stacking a positive electrode including a current collector carrying an active material layer thereon, a negative electrode including a current collector carrying an active material layer thereon and a separator interposed therebetween, wherein at least one of the current collector of the positive electrode and the current collector of the negative electrode is exposed at an end thereof and the exposed end is welded to a current collector terminal, the active material layer formed on the surface of the at least one of the current collectors welded to the current collector terminal is covered with a heat resistant porous film and a vertical end edge of the separator is flush with or positioned inside relative to a vertical end edge of the heat resistant porous film, said vertical end edge of said separator and said vertical end edge of said heat resistant porous film being adjacent to the exposed end of the current collector which is welded to the current collector terminal, said vertical end edge of said separator, said vertical end edge of the heat resistant porous film and a vertical end edge of said at least one of the current collectors extend parallel with one another, and the heat resistant porous film has a melting point higher than that of the separator and has a thermal conductivity lower than that of the current collector.

2. The sealed battery of claim 1, wherein the vertical end edge of the separator is positioned outside relative to a vertical end edge of the active material layer formed on the surface of the at least one of the current collectors welded to the current collector terminal.

3. The sealed battery of claim 1, wherein the melting point of the heat resistant porous film is 200° C. or higher.

4. The sealed battery of claim 1, wherein the heat resistant porous film is made of an inorganic oxide filler and a binder.

5. The sealed battery of claim 1 is a nonaqueous electrolyte secondary battery.

* * * * *